United States Patent
Jain et al.

(10) Patent No.: US 10,530,920 B1
(45) Date of Patent: Jan. 7, 2020

(54) MOBILE DEVICE TRANSPORTATION MODE MANAGEMENT DEVICE, SYSTEM AND METHOD

(71) Applicant: STMICROELECTRONICS, INC., Coppell, TX (US)

(72) Inventors: Mahaveer Jain, Santa Clara, CA (US); Mahesh Chowdhary, San Jose, CA (US)

(73) Assignee: STMICROELECTRONICS, INC., Coppell, TX (US)

(*) Notice: Subject to any disclaimer, the term of this patent is extended or adjusted under 35 U.S.C. 154(b) by 0 days.

(21) Appl. No.: 16/407,947

(22) Filed: May 9, 2019

(51) Int. Cl.
*H04B 1/38* (2015.01)
*H04M 1/725* (2006.01)

(52) U.S. Cl.
CPC ... *H04M 1/72569* (2013.01); *H04M 1/72577* (2013.01); *H04M 2250/12* (2013.01)

(58) Field of Classification Search
CPC ......... H04W 52/0274; H04M 1/72572; H04M 2250/12; H04M 1/72569; H04M 1/72577; H04M 1/72563; H04B 7/185; G06F 15/00; G01C 21/165; G01C 21/20; B64C 25/50; B64C 25/405; G08G 5/06; G08B 21/00
USPC ......................... 455/565, 127.1; 340/5.1; 1/1
See application file for complete search history.

(56) References Cited

U.S. PATENT DOCUMENTS

| | | | | |
|---|---|---|---|---|
| 8,195,108 B2* | 6/2012 | Sheynblat | ......... | H04W 52/0274 455/127.1 |
| 8,655,307 B1* | 2/2014 | Walker | ............... | H04W 52/0212 455/405 |
| 9,019,068 B2* | 4/2015 | Varoglu | ................. | H04B 7/185 340/5.1 |
| 9,992,324 B2* | 6/2018 | Tanabe | ............... | H04M 1/72569 |
| 2001/0053709 A1* | 12/2001 | Terasaka | .................... | G01S 5/02 455/567 |
| 2003/0060198 A1* | 3/2003 | Li | ......................... | H04W 88/02 455/434 |
| 2005/0101287 A1* | 5/2005 | Jin | ........................ | H04M 1/677 455/404.1 |
| 2006/0178108 A1* | 8/2006 | Chotoku | .................. | H04M 1/66 455/26.1 |

(Continued)

FOREIGN PATENT DOCUMENTS

| | | |
|---|---|---|
| CN | 102607562 B | 10/2014 |
| CN | 105384106 A * | 3/2016 |
| WO | 2013/044399 A1 | 4/2013 |

OTHER PUBLICATIONS

Tawk et al., "A New Movement Recognition Technique for Flight Mode Detection," *International Journal of Vehicular Technology* 13:149813, 2013, 19 pages.

*Primary Examiner* — Mahendra R Patel
(74) *Attorney, Agent, or Firm* — Seed IP Law Group LLP

(57) ABSTRACT

A portable device includes one or more memories and travel mode control circuitry coupled to the one or more memories. The travel mode control circuitry, in operation, monitors motion data and temperature data to detect a first travel state of the device. When the first travel state of the device is detected, motion data and pressure data are monitored to detect a transition from the first travel state to a second travel state of the device. When the transition to the second travel state of the device is detected, one or more control signals are generated to cause the device to enter a first travel mode of operation.

19 Claims, 11 Drawing Sheets

(56) References Cited

U.S. PATENT DOCUMENTS

| | | | |
|---|---|---|---|
| 2008/0108331 A1* | 5/2008 | Jin | H04W 4/90 455/414.1 |
| 2009/0186633 A1* | 7/2009 | Yonker | H04M 1/72572 455/456.6 |
| 2010/0099354 A1* | 4/2010 | Johnson | H04M 1/7253 455/41.1 |
| 2010/0132032 A1* | 5/2010 | Vanover | H04L 63/08 726/15 |
| 2011/0252248 A1* | 10/2011 | Cameron | G06Q 10/04 713/300 |
| 2015/0347701 A1* | 12/2015 | Atkin | G16H 10/40 705/2 |
| 2016/0273986 A1* | 9/2016 | Neubarth | G01L 9/0073 |
| 2017/0108236 A1* | 4/2017 | Guan | G05B 15/02 |

* cited by examiner

MOBILE DEVICE TRANSPORTATION MODE MANAGEMENT DEVICE, SYSTEM AND METHOD

BACKGROUND

Technical Field

The present disclosure generally relates to mobile devices, such as mobile phones, laptop, tablet, shipping transponders, etc., and devices, systems and methods of managing operational modes of such mobile devices.

Description of the Related Art

The use of wireless communication devices may be restricted when such devices are being transported, such during a flight or on a train or ferry ride, to minimize interference in other radio communications related to the transportation system, to limit drawing of power from outlets, etc. For example, the use of mobile or handheld devices during ascent and descend or during an entire flight may be prohibited or restricted, use on a train when entering or leaving a station may be restricted, use on ferries when entering or leaving a harbor may be restricted, etc.

Such wireless communication devices may include mobile phones, tablets, laptops, embedded processing systems, asset tracking transponders, etc. A user may power-off a device, or manually enter an airplane mode of operation to comply with the use restrictions.

BRIEF SUMMARY

In an embodiment, a device comprises: one or more memories; and travel mode control circuitry coupled to the one or more memories, wherein the travel mode control circuitry, in operation: monitors motion data and temperature data to detect a first travel state of the device; responds to detection of the first travel state of the device by monitoring motion data and pressure data to detect a transition from the first travel state to a second travel state of the device; and responds to detection of the transition to the second travel state of the device by generating one or more control signals to cause the device to enter a first travel mode of operation. In an embodiment, the first travel state is an airplane runway state, the second travel state is an airplane takeoff state and the first travel mode of operation is an airplane mode of operation. In an embodiment, the travel mode control circuitry, in operation, determines an energy of acceleration based on the motion data and detects a travel state of the device based on the determined energy of acceleration. In an embodiment, the travel mode control circuitry, in operation, determines whether the temperature data indicates a temperature of the device is within a threshold temperature range. In an embodiment, the travel mode control circuitry, in operation, employs a motion activation detection algorithm to detect the first travel state. In an embodiment, the travel mode control circuitry, in operation, employs the motion activation detection algorithm to detect the transition to the second travel state. In an embodiment, the travel mode control circuitry, in operation: monitors the motion data to detect significant human motion inconsistent with the first travel state; and responds to detection of significant human motion inconsistent with the first travel state by determining the device is not in the first travel state. In an embodiment, the travel mode control circuitry, in operation: responds to detection of the transition to the second travel state by monitoring motion data and pressure data to detect a transition from the second travel state to a third travel state; and responds to detection of the transition to the third travel state by generating one or more control signals to cause the device to enter a second travel mode of operation. In an embodiment, the travel mode control circuitry, in operation: responds to detection of the first travel state by monitoring motion data, temperature data and pressure data; and responds to monitored data inconsistent with the first travel state by determining the first travel state is not detected. In an embodiment, the travel mode control circuitry, in operation, employs one or more thresholds values and one or more threshold periods of time to detect a travel state of the device.

In an embodiment, a system comprises: a temperature sensor; a pressure sensor; a motion sensor; and travel mode control circuitry coupled to the temperature sensor, the pressure sensor and the motion sensor, wherein the travel mode control circuitry, in operation: monitors motion data and temperature data to detect a first travel state; responds to detection of the first travel state by monitoring motion data and pressure data to detect a transition from the first travel state to a second travel state; and responds to detection of the transition to the second travel state by generating one or more control signals to cause the system to enter a first travel mode of operation. In an embodiment, the first travel state is an airplane runway state, the second travel state is an airplane takeoff state and the first travel mode of operation is an airplane mode of operation. In an embodiment, the travel mode control circuitry, in operation, determines an energy of acceleration based on the motion data and detects a travel state based on the determined energy of acceleration. In an embodiment, the travel mode control circuitry, in operation, determines whether the temperature data indicates a temperature is within a threshold temperature range. In an embodiment, the travel mode control circuitry, in operation, employs a motion activation detection algorithm to detect the first travel state. In an embodiment, the travel mode control circuitry, in operation: monitors the motion data to detect significant human motion inconsistent with the first travel state; and responds to detection of significant human motion inconsistent with the first travel state by determining the first travel state is not detected.

In an embodiment, a method comprises: monitoring motion data and temperature data to detect a first travel state of a device; responding to detection of the first travel state of the device by monitoring motion data and pressure data to detect a transition from the first travel state to a second travel state of the device; and responding to detection of the transition to the second travel state of the device by generating one or more control signals to cause the device to enter a first travel mode of operation. In an embodiment, the first travel state is an airplane runway state, the second travel state is an airplane takeoff state and the first travel mode of operation is an airplane mode of operation. In an embodiment, the method comprises employing a motion activation detection algorithm to detect the first travel state.

In an embodiment, a non-transitory computer-readable medium has contents which cause travel mode control circuitry to perform a method, the method comprising: monitoring motion data and temperature data to detect a first travel state of a device; responding to detection of the first travel state of the device by monitoring motion data and pressure data to detect a transition from the first travel state to a second travel state of the device; and responding to detection of the transition to the second travel state of the device by generating one or more control signals to cause the device to enter a first travel mode of operation. In an embodiment, the first travel state is an airplane runway state, the second travel state is an airplane takeoff state and the first travel mode of operation is an airplane mode of operation. In an embodiment, the contents comprise instructions executed by the travel mode control circuitry.

DETAILED DESCRIPTION

Figure 1:
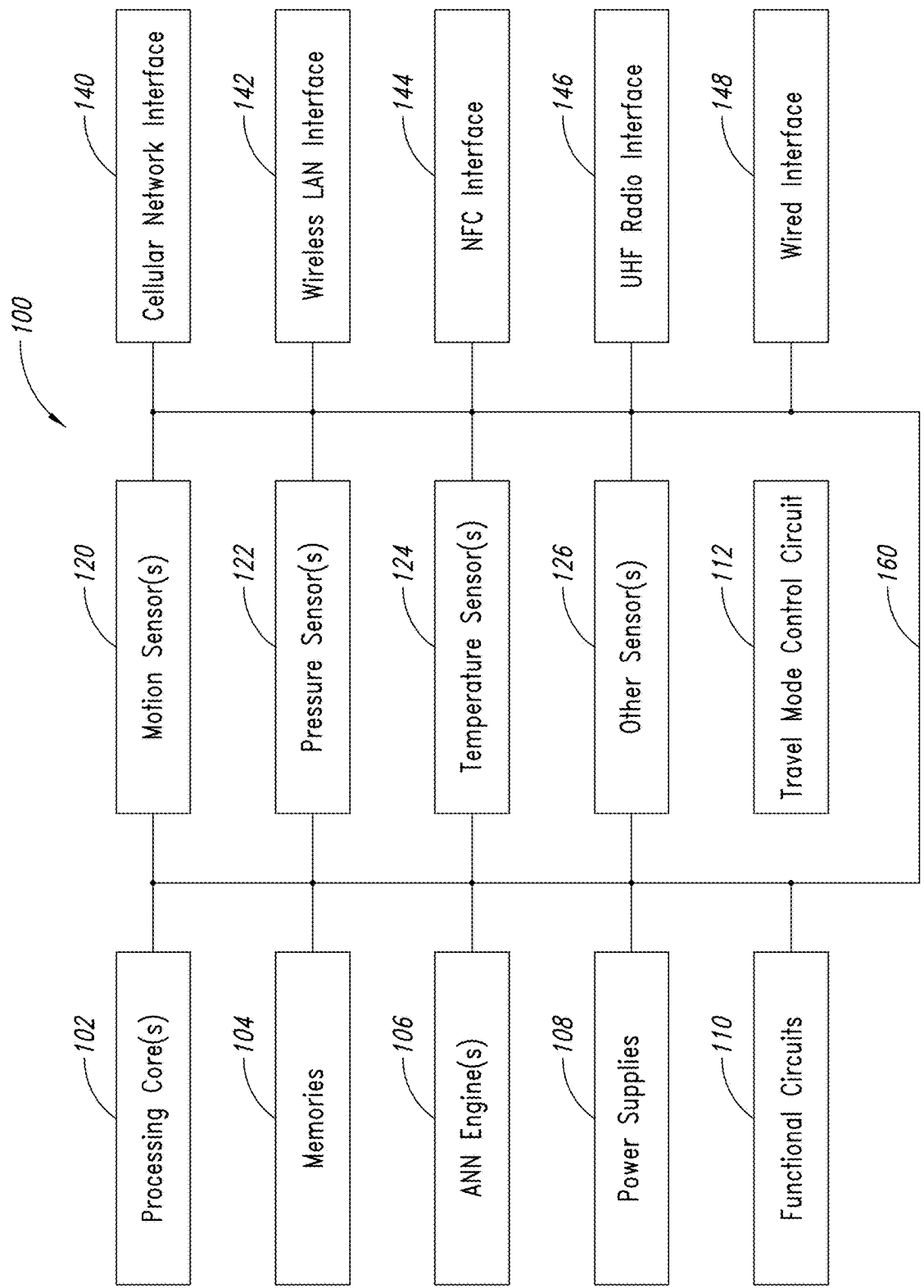
FIG. 1 is a functional block diagram of an embodiment of an electronic device or system having a processing core and a plurality of sensors according to an embodiment.

In the following description, certain details are set forth in order to provide a thorough understanding of various embodiments of devices, systems, methods and articles. However, one of skill in the art will understand that other embodiments may be practiced without these details. In other instances, well-known structures and methods associated with, for example, circuits, such as transponders, transistors, multipliers, adders, dividers, comparators, transistors, integrated circuits, logic gates, finite state machines, memories, interfaces, bus systems, etc., have not been shown or described in detail in some figures to avoid unnecessarily obscuring descriptions of the embodiments.

Unless the context requires otherwise, throughout the specification and claims which follow, the word "comprise" and variations thereof, such as "comprising," and "comprises," are to be construed in an open, inclusive sense, that is, as "including, but not limited to." Reference to "at least one of" shall be construed to mean either or both the disjunctive and the inclusive, unless the context indicates otherwise.

Reference throughout this specification to "one embodiment," or "an embodiment" means that a particular feature, structure or characteristic described in connection with the embodiment is included in at least one embodiment. Thus, the appearances of the phrases "in one embodiment," or "in an embodiment" in various places throughout this specification are not necessarily referring to the same embodiment, or to all embodiments. Furthermore, the particular features, structures, or characteristics may be combined in any suitable manner in one or more embodiments to obtain further embodiments.

The headings are provided for convenience only, and do not interpret the scope or meaning of this disclosure.

The sizes and relative positions of elements in the drawings are not necessarily drawn to scale. For example, the shapes of various elements and angles are not drawn to scale, and some of these elements are enlarged and positioned to improve drawing legibility. Further, the particular shapes of the elements as drawn are not necessarily intended to convey any information regarding the actual shape of particular elements, and have been selected solely for ease of recognition in the drawings.

FIG. 1 is a functional block diagram of an embodiment of an electronic device or system 100 of the type to which the embodiments which will be described may apply. The system 100 comprises one or more processing cores or circuits 102. The processing cores 102 may comprise, for example, one or more processors, a state machine, a microprocessor, a programmable logic circuit, discrete circuitry, logic gates, registers, etc., and various combinations thereof. The processing cores may control overall operation of the system 100, execution of application programs by the system 100, implementation of functional blocks of the system, etc.

The system 100 includes one or more memories 104, such as one or more volatile and/or non-volatile memories which may store, for example, all or part of instructions and data related to control of the system 100, applications and operations performed by the system 100, etc. The memories 104 may include one or more primary memories, one or more secondary memories and one or more cache memories. The primary memories are typically the working memory of the system 100 (e.g., the memory or memories upon which the processing cores 102 work). The secondary memories may typically be a non-volatile memory storing instructions and data, which may be retrieved and stored in the primary memory when needed by the system 100. The cache memory may be a relatively fast memory compared to the secondary memory and typically has a limited size, which may be larger than a size of the primary memory. The cache memory temporarily stores code and data for later use by the system 100. Instead of retrieving needed code or data from the secondary memory for storage in the primary memory, the system 100 may check the cache memory first to see if the data or code is already stored in the cache memory.

The system 100 as illustrated includes one or more artificial intelligence engines, which as illustrated is an artificial neural network (ANN) engine 106. The system 100 also includes one or more power supplies 108 and one or more other functional circuits 110, such as one or more memory controllers, one or more displays, one or more security circuits, etc.

The system 100 as illustrated includes one or more sensors, such as one or more motion sensors 120, one or more pressure sensors 122, one or more temperature sensors 124, one or more other sensor(s) 126, etc. The motion sensors 120 may be, for example, one or more gyroscopes, one or more accelerometers, etc., and may implemented using MEMS technology and provide movement data with respect to one, two or three axes of movement. The pressure sensors 122 may typically comprise one or more force-collector type pressure sensors providing pressure data relative to a reference pressure, such as a pressure of a perfect vacuum, a standard reference pressure, etc., and may typically be implemented, for example, using piezo-resistive strain, capacitive, electromagnetic, or piezoelectric sensing technologies. The temperature sensors 124 may typically comprise one or more negative temperature coefficient thermistors, one or more resistance temperature detectors, one or more thermocouples, one or more temperature sensitive diode pairs, etc., and various combinations thereof. The other sensors 126 may include acoustic sensors, altimeters, image sensors, etc. The various sensors may provide analog or digital output signals. Analog-to-digital converters (not shown) may be employed.

The system 100 includes one or more interfaces, which as illustrated include one or more cellular network interfaces 140 (e.g., GSM, CDMA, etc.), one or more wireless local area network (WIFI) interfaces 142, one or more near-field communication (NFC) interfaces 144, one or more UHF radio interfaces (e.g., BLUETOOTH™), and one or more wired interfaces 148 (e.g., Universal Serial Bus ports, power ports, audio ports, video ports, etc.). The various interfaces may include antennas, power supplies, user input devices, etc. The wired and other interfaces may, in some embodiments, draw power from an external source, such as a power port of an airplane, a wireless charging system, etc.

The system 100 also includes one or more bus systems such as one or more data, address, power or control buses coupled to the various components of the system 100, and which for ease of illustration are shown as a bus system 160.

The system 100 also includes a travel mode controller or circuit 112, which, in operation, controls one or more travel modes of operation of the system 100 based on data sensed by one or more sensors, such as the sensors 120, 122, 124, 126 of the system 100. The travel mode controller 112 may be implemented, for example, as a separate circuit, as instructions executing on the processor 102, using the ANN engine 106, etc., and various combinations thereof. One or more embodiments of the methods disclosed herein may be employed by the travel mode controller 112 to, in operation, control operating modes of the system 100, operating modes of the various components of the system 100, and various combinations thereof.

In some embodiments, the system 100 may include more components than illustrated, may include fewer components than illustrated, may split illustrated components into separate components, may combine illustrated components, etc., and various combinations thereof. For example, the ANN engine 106 may be omitted in some embodiments. In another example, one or more of the sensors may be external to the system 100 and communicatively coupled to the system 100 via one or more interfaces, such as one of the wired interfaces 148, etc.

Handheld devices such as mobile phones, tablets and laptops are often equipped with GSM/LTE, WLAN, NFC, UHF and other wireless interfaces, and may have powerful batteries. As previously mentioned, the use of wireless communication devices may be restricted when the devices are being transported. For convenience, an example with reference to transportation in an airplane is discussed herein. Embodiments may be employed which are directed to other modes of transportation. During a flight, use of wireless communication interfaces may be restricted to minimize interference with radio communications between the flight and airport control. In addition, the drawing of power from power ports of the airplane (e.g., to charge the batteries) or from the batteries (e.g., to perform power intensive operations, may similarly be restricted to avoid the risk of drawing excess power from the aircraft or the risk of overheating or exploding batteries.

Conventionally, a user is asked to manually turn a device off or place the device in airplane mode, and to unplug the device from any ports of the airplane. Dependence on a user manually placing a device in airplane mode is unreliable and unplugging a device from ports of the airplane is unreliable. For shipping applications, airplane mode detection also may provide status/tracking information regarding a shipment.

In theory, it also is possible to utilize a combination of a radio transceiver and barometer to determine when to place the device in a particular mode of operation, such as an airplane mode, but the device must be equipped with a barometer and a transceiver or receiver. The barometer can measure the ambient atmospheric pressure, which can be used to compute altitude with respect to Mean Sea Level (MSL). Based on altitude, it is possible to identify when the plane is ascending, descending or on the ground. However, the pressure measured by a barometer inside an airplane cabin is not necessarily equal to atmospheric pressure, especially at higher altitudes. Cabin pressurization schemes also may vary between types of aircraft and the altitude of the airport at which an aircraft departs or lands. Thus, due to cabin pressurization it is difficult to use pressure measured by barometer to determine altitude, and therefrom to determine an appropriate operating mode of a mobile device.

Figure 2:
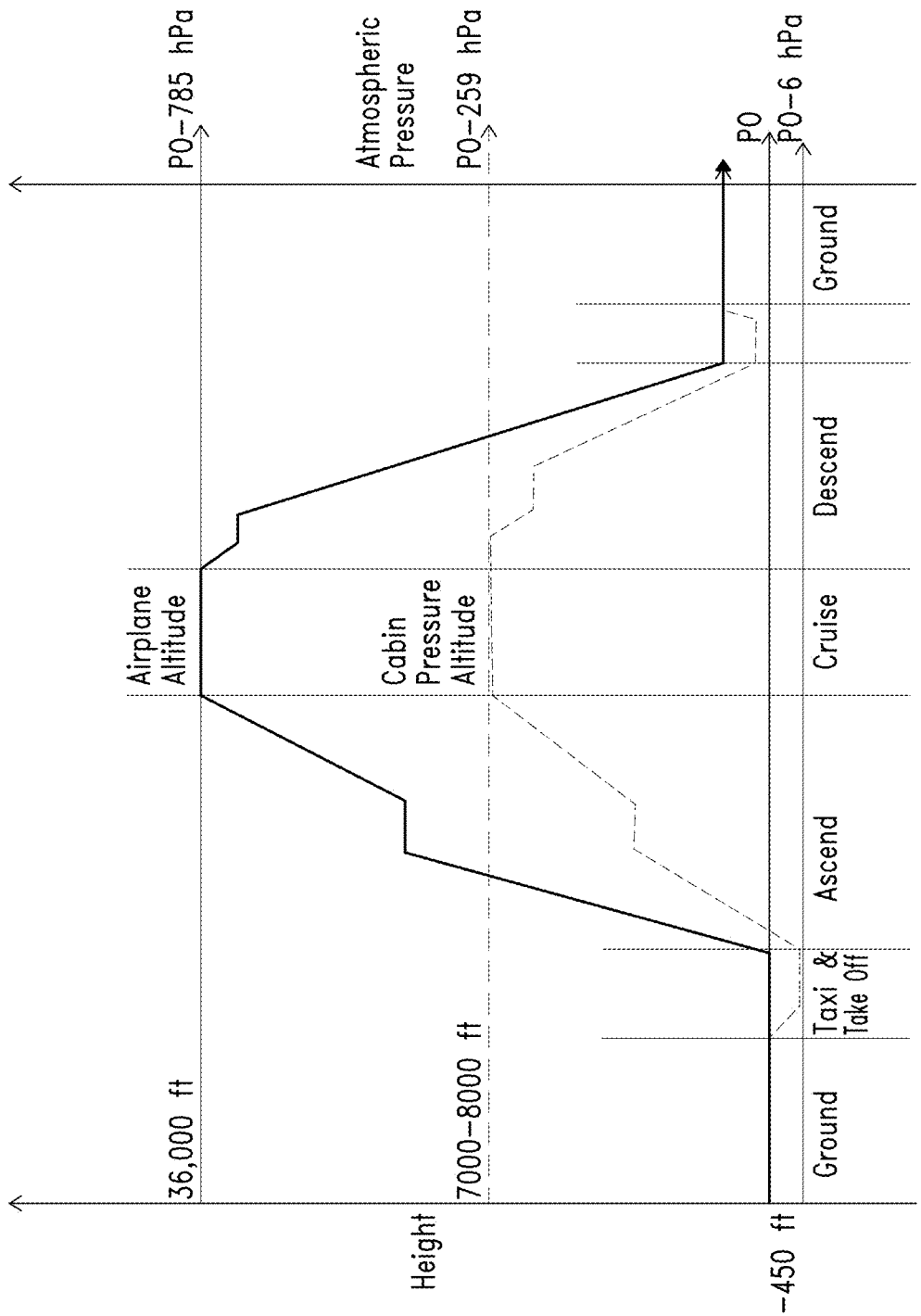
FIG. 2 is a graphical illustration of an example relationship between cabin pressure (altitude) and airplane altitude.

An example relationship between cabin pressure/altitude and airplane altitude is represented by FIG. 2. On the ground before takeoff, the pressure of the cabin and the atmosphere is the same. During takeoff, the process of pressurization is started, for example, to smooth the transition when the plane is ascending and avoid a feeling of low pressure in the cabin. The barometer tends to show a higher pressure (e.g., 6-7 hPa higher than the atmospheric pressure) at takeoff. Pressurization at takeoff also may be airplane specific. For example, small planes may not employ any cabin pressurization at all, and typically do not operate above 14,000 feet.

In the ascent stage, the pressure inside the cabin decreases at a slower rate than the atmospheric pressure. The altitude determined based on the barometer readings will be smaller than the airplane altitude. The altitude based on the cabin pressure climb may be limited, for example to 1000 feet-per-minute, and may saturate at, for example, 8,000 feet, even when the airplane reaches a height of 36,000 feet.

In the descent stage, the cabin pressure slowly increases and may be limited, for example, to a variation of 750 feet-per-minute. At the end of the descent, some aircraft pressurize the cabin by 6-7 hPa, and slowly adjust to reach the outside pressure. The altitudes of the various airports also may be different. Thus, relying on a pressure data alone to determine a mode of operation may be difficult. Reliance on a transceiver or receiver (such as a GPS system) is difficult because when in airplane mode, such transceivers or receivers are not active.

In an embodiment, movement data, such as acceleration data indicative of global or localized movement from one or more movement sensors, is considered in combination with pressure data, such as data from a pressure sensor, to determine an appropriate operating mode of a system such as a mobile device. In an embodiment, detecting conditions for setting a device to operate in an airplane mode may include detecting a runway state and a takeoff state.

Figure 3:
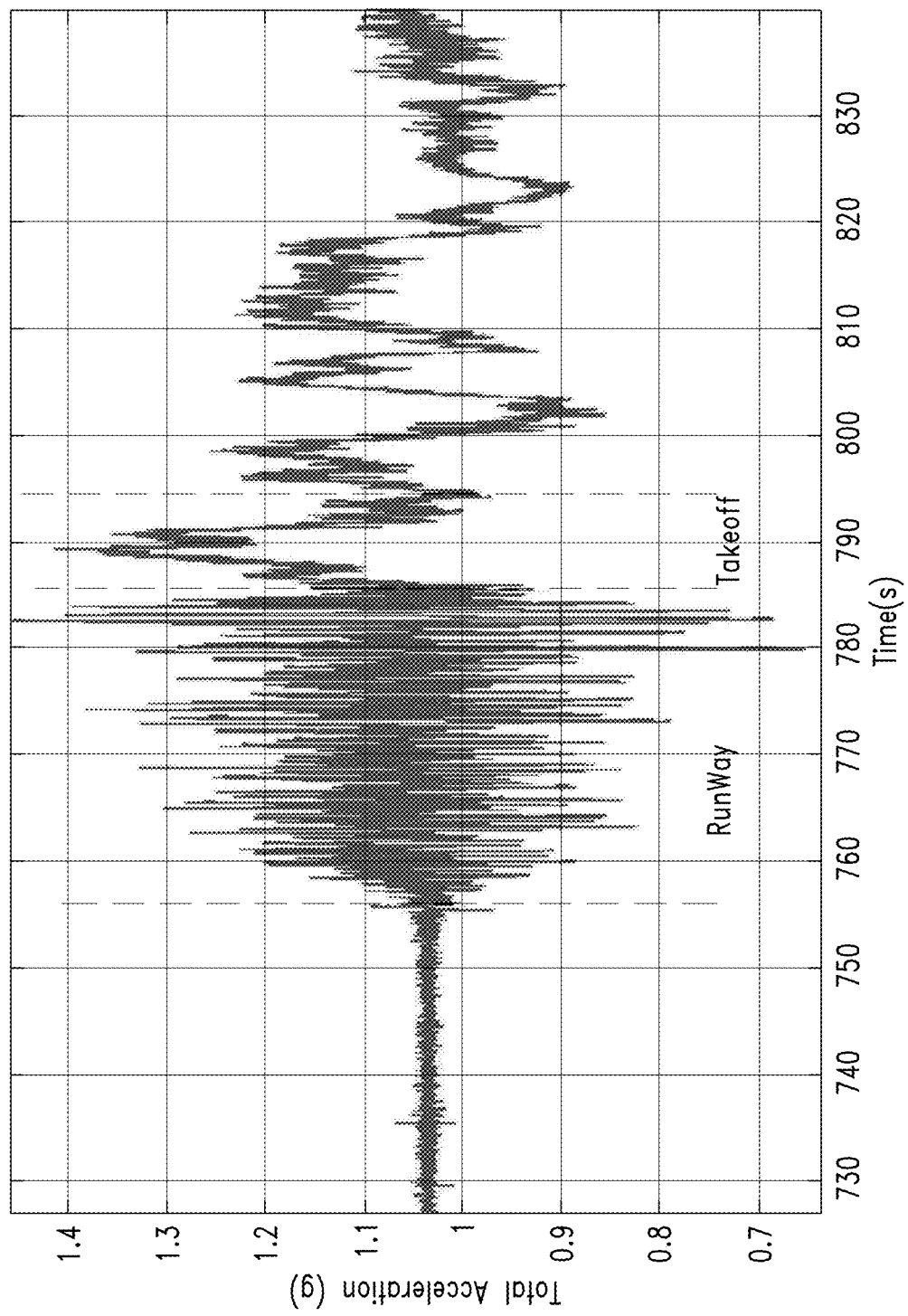
FIG. 3 is a graphical illustration of an example acceleration profile of a device during a takeoff procedure of an airplane.

In an embodiment, detecting a runway state and a takeoff state may be performed using acceleration data. FIG. 3 is a graphical illustration of an example acceleration profile of a device during a takeoff procedure of an airplane. There are four distinct patterns which are observed during the takeoff procedure. A first pattern is associated with a passenger having a portable device (or with a transponder in a cargo hold) in the airplane during taxiing. A second pattern is observed when accelerating on the runway. A third pattern is observed during takeoff as the plane lifts from the runway, and a fourth pattern is observed as the plane continues to rise to cruising altitude.

Figure 4:
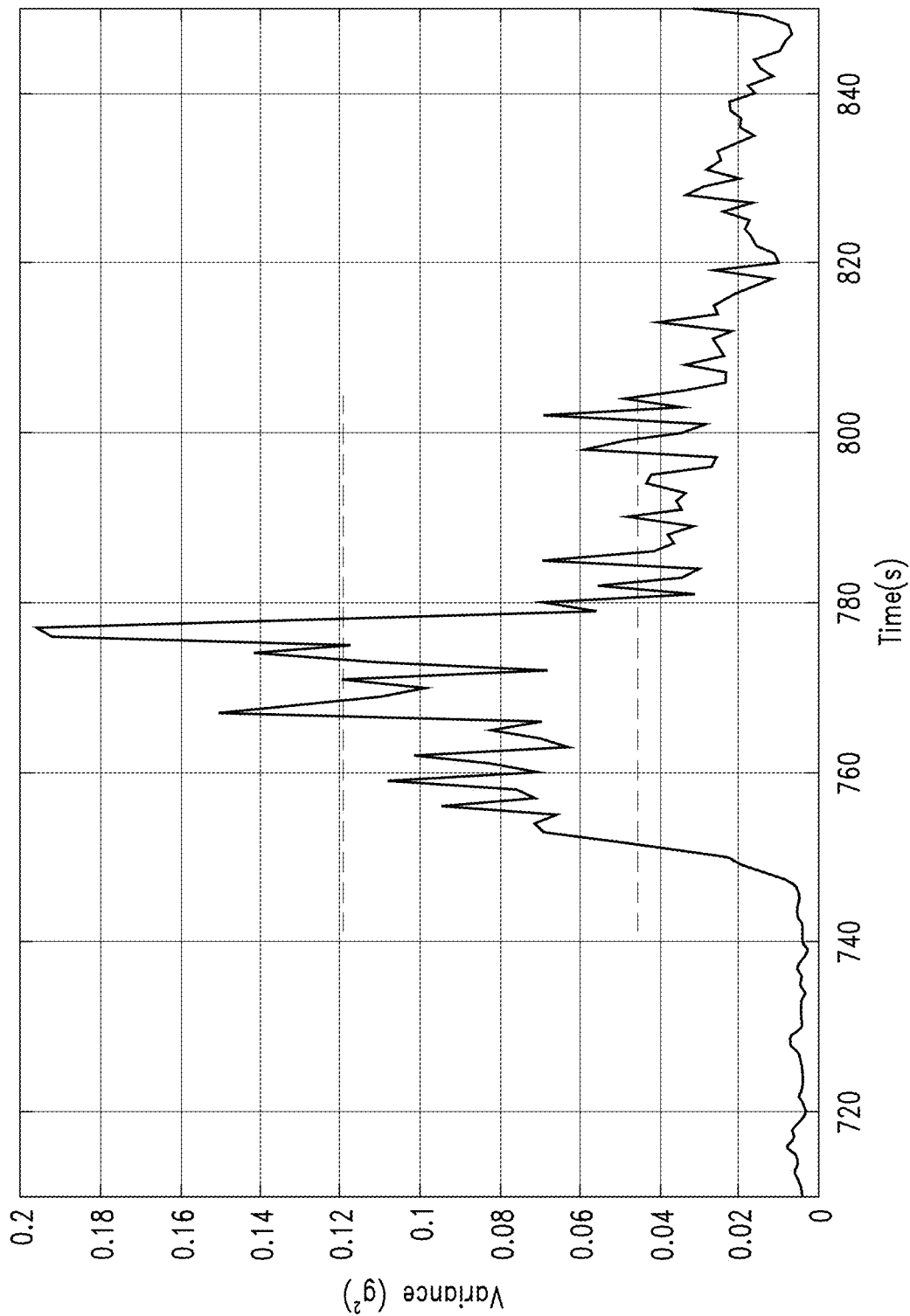
FIG. 4 illustrates an example acceleration variance of a device during a takeoff procedure in an embodiment.

FIG. 4 illustrates an example acceleration variance of a device during a takeoff procedure together with thresholds that may be employed to detect one or more states of a device in an embodiment. For example, if the acceleration variance is between the two thresholds, this may serve as an indication the device may be in a runway state.

Figure 5:
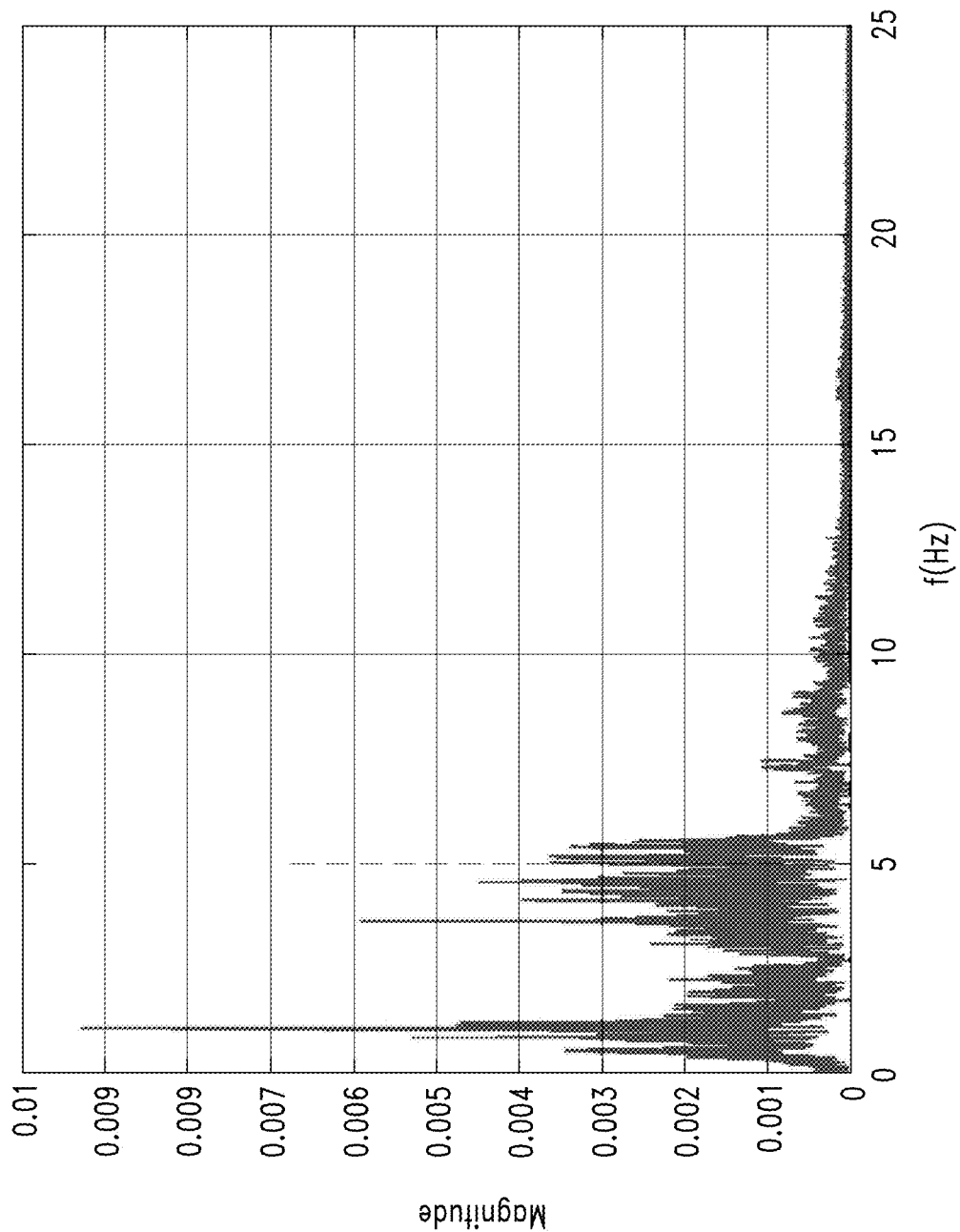
FIG. 5 illustrates an example frequency response of an energy of acceleration of a device during a takeoff procedure.

FIG. 5 illustrates an example frequency response of an energy of acceleration of a device during a takeoff procedure. There are two distinct bands in the 0-50 Hz range. The ratio of the energy in the bands may be employed to detect one or more states of a device in an embodiment. For example, the energy in the 0-5 Hz band being greater than the energy in the 5-50 Hz band may serve as an indication the device is in a runway state. In another example, if the total energy in the 0-5 Hz band being within [0.025, 0.2] times the output data rate (ODR) may serve as an indication a device is in a takeoff state.

Figure 6:
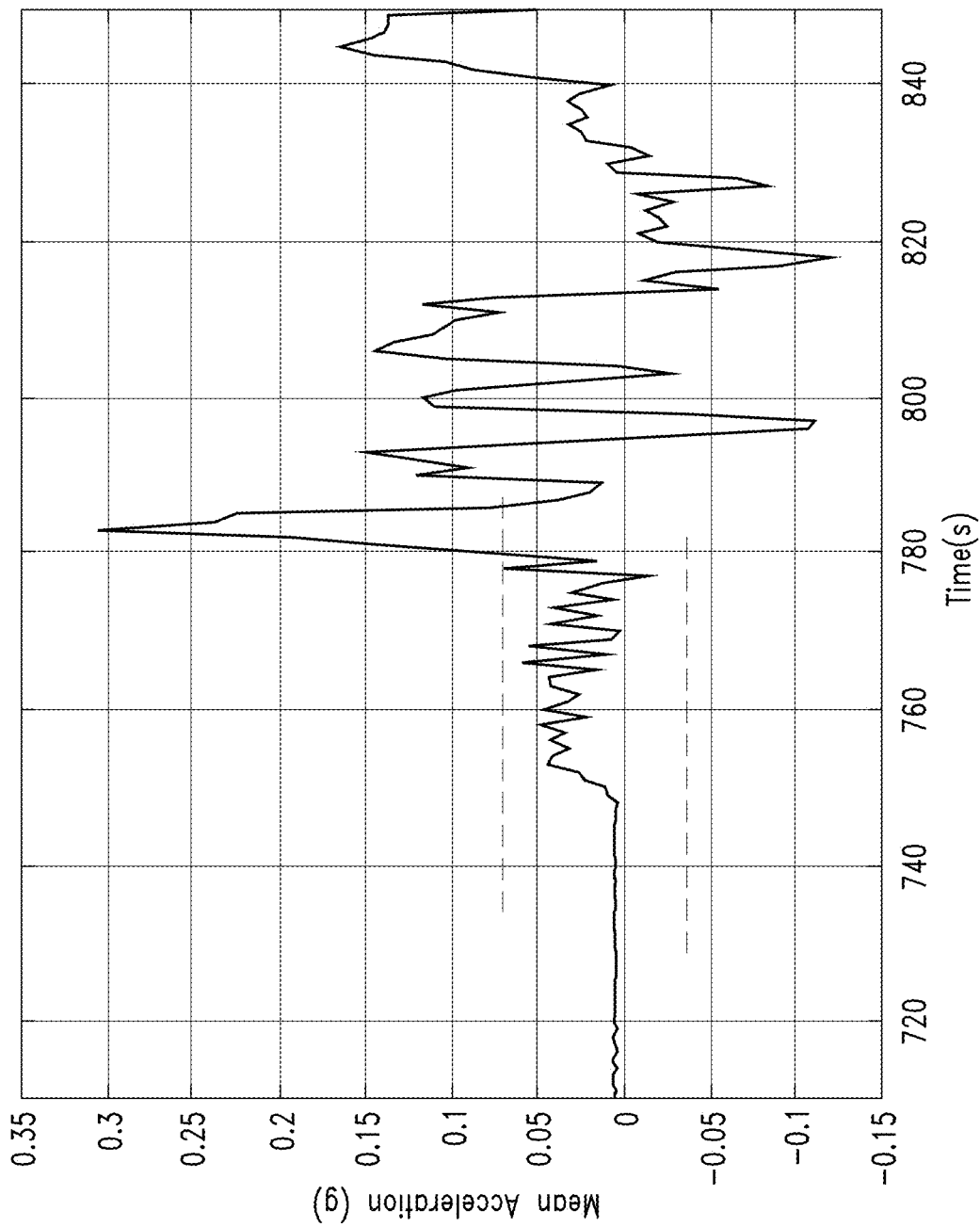
FIG. 6 illustrates an example of a typical mean acceleration curve of a device during a takeoff procedure.

FIG. 6 illustrates an example of a typical mean acceleration curve of a device during a takeoff procedure. The mean acceleration may be employed to detect one or more states of a device in an embodiment. For example, if the mean acceleration is between 2 threshold values, as shown by Threshold 1 and 2 in FIG. 6 (marked by dashed line), a device may be determined to be in a takeoff state.

Figure 7:
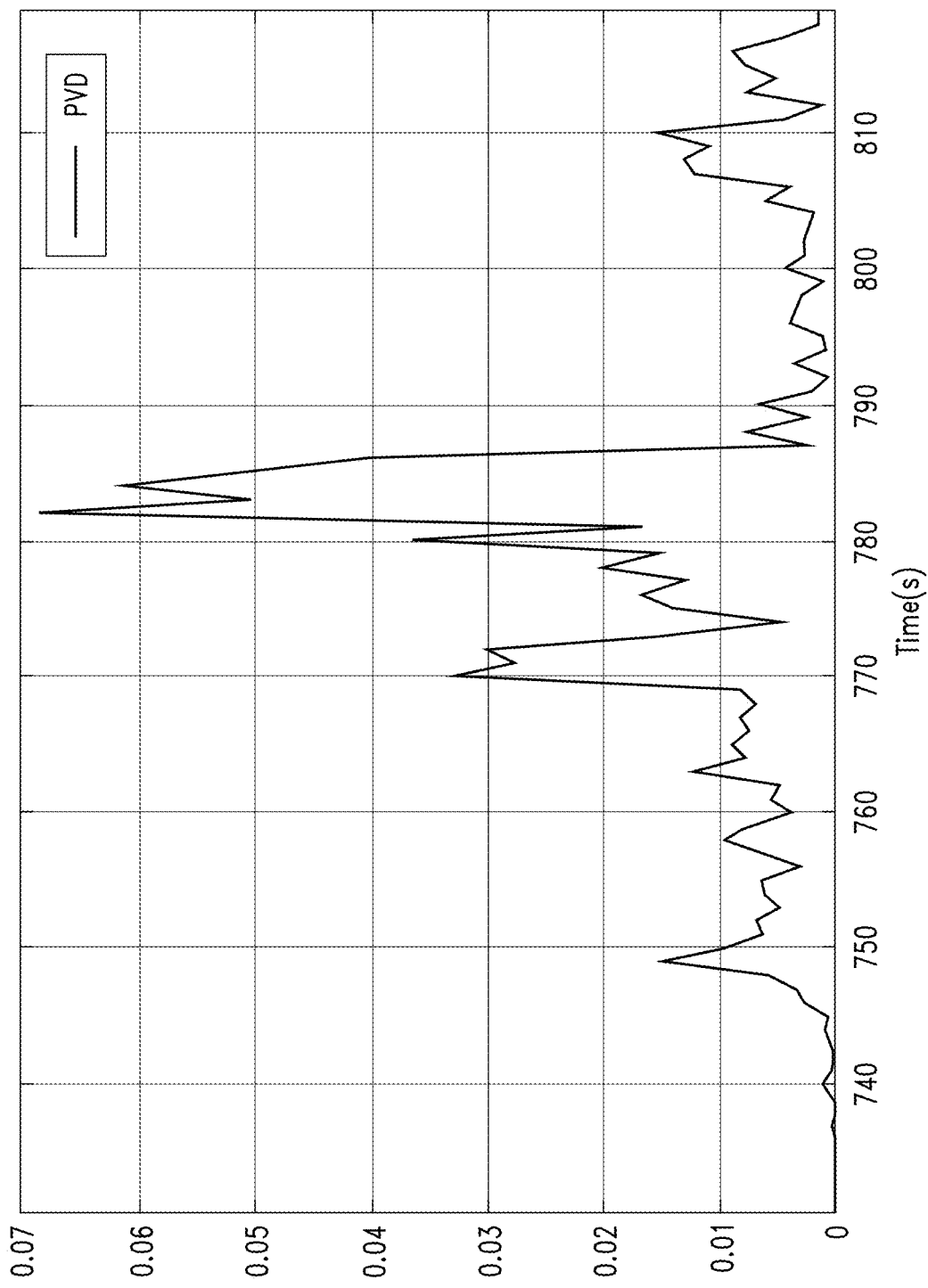
FIG. 7 is a graphical illustration of a motion activation detection (MAD) function or algorithm.

FIG. 7 is a graphical illustration of a motion activation detection (MAD) function or algorithm. The acceleration amplitude during airplane acceleration on a runway is typically small (e.g., less than 0.3 g). This facilitates using a motion activation detection algorithm to detect motion in an embodiment, similar to the manner in which a voice activation detection algorithm may be used to detect voices. A MAD function may be defined as follows:

$$MAD(m)=P(m)\times(1-Z_s(m)) \quad \text{Equation 1}$$

where P(m) is the power in the acceleration signal and $Z_s(m)$ is the zero crossing rate for a 1 second window.

In an embodiment, a runway state may be detected based on the acceleration features described above. A plane may typically be in a runway state for a period of 15-25 seconds. The features may be determined periodically, such as on a one-second window of accelerometer data. Historical data may be maintained for a period of time, such as thirty seconds, and if conditions consistent with a runway state exist for a threshold period of time (e.g., 15 seconds), a runway state of a device may be detected.

For example, a runway state may be detected in response to the following conditions being satisfied for a 15-second period of time: a standard deviation being within a range of threshold values (e.g., within 0.01 and 0.5 g); an absolute mean of a Euclidean norm of acceleration being less than a threshold value (e.g., 0.1 g); a MAD value being within a threshold range (e.g., between 0.0015 and 0.025), and an energy level in the 0-5 Hz range being greater than an energy level in the 5-50 Hz range.

In an embodiment, after a runway state is detected, a device may start monitoring for a takeoff state. During takeoff, the total acceleration of a device is positive due to the liftoff of the airplane from the ground. In an embodiment, if the total acceleration exceeds a threshold acceleration level for a threshold period of time after a runway state has been detected, the device may be determined to be in a takeoff state. The takeoff period usually lasts 5 seconds. Thus, a threshold period of time such as 3 seconds may be employed. In an embodiment, other factors such as the factors discussed above may be considered as well. As discussed, features may be determined periodically, such as on a one-second window of accelerometer data. Historical data may be maintained for a period of time, such as 5 seconds, and if conditions consistent with a takeoff state exist for a threshold period of time (e.g., 3 seconds), a takeoff state of a device may be detected.

For example, a takeoff state may be detected in response to the following conditions being satisfied for a 3-second period of time after a runway state has been detected: a standard deviation being within a range of threshold values (e.g., within 0.01 and 0.25 g); an absolute mean of a Euclidean norm of acceleration being less than a threshold value (e.g., 0.6 g); a MAD value being within a threshold range (e.g., between 0.025 and 0.05), and an energy level in the 0-5 Hz range being within a threshold range (e.g., within (0.025, 0.2)×ODR).

Figure 8:
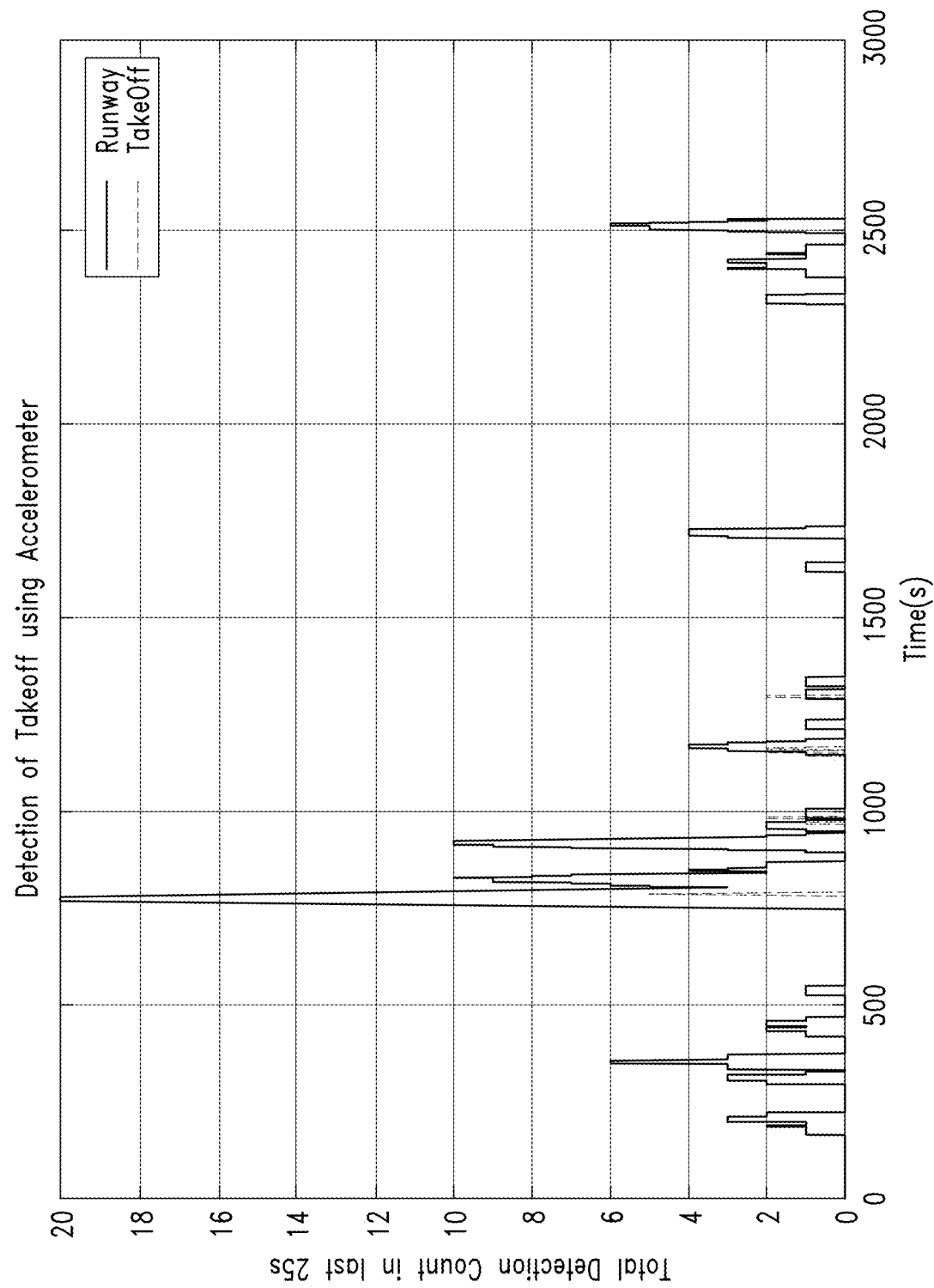
FIG. 8 illustrates an example behavior of an embodiment of an acceleration-based state detector during a flight.

FIG. 8 illustrates an example behavior of an acceleration-based state detector during a flight applying the example threshold periods of time discussed above. As illustrated, both the runway state and the takeoff state are detected approximately at time 750 seconds.

In an embodiment, the accelerometer data also may be monitored to detect other types of motion, for example, accelerometer data consistent with types of motion that are inconsistent with a device being in an airplane about to take off. For example, motion data consistent with a jogging pattern or a long walk is inconsistent with a device being on a plane about to take off. In an embodiment, a runway or takeoff state may be rejected for a threshold period of time after an inconsistent state is detected. For example, if a jogging state is detected, a runway state or a takeoff state may be rejected until a period of 200 seconds has elapsed. A similar algorithm may be employed to determine whether a device is coming out of an airplane mode, or if an airplane state has been detected in error. For example, motion data consistent with walking for more than a threshold period of time may serve as an indication that the device should not be considered to be in a runway state or a takeoff state.

Figure 9:
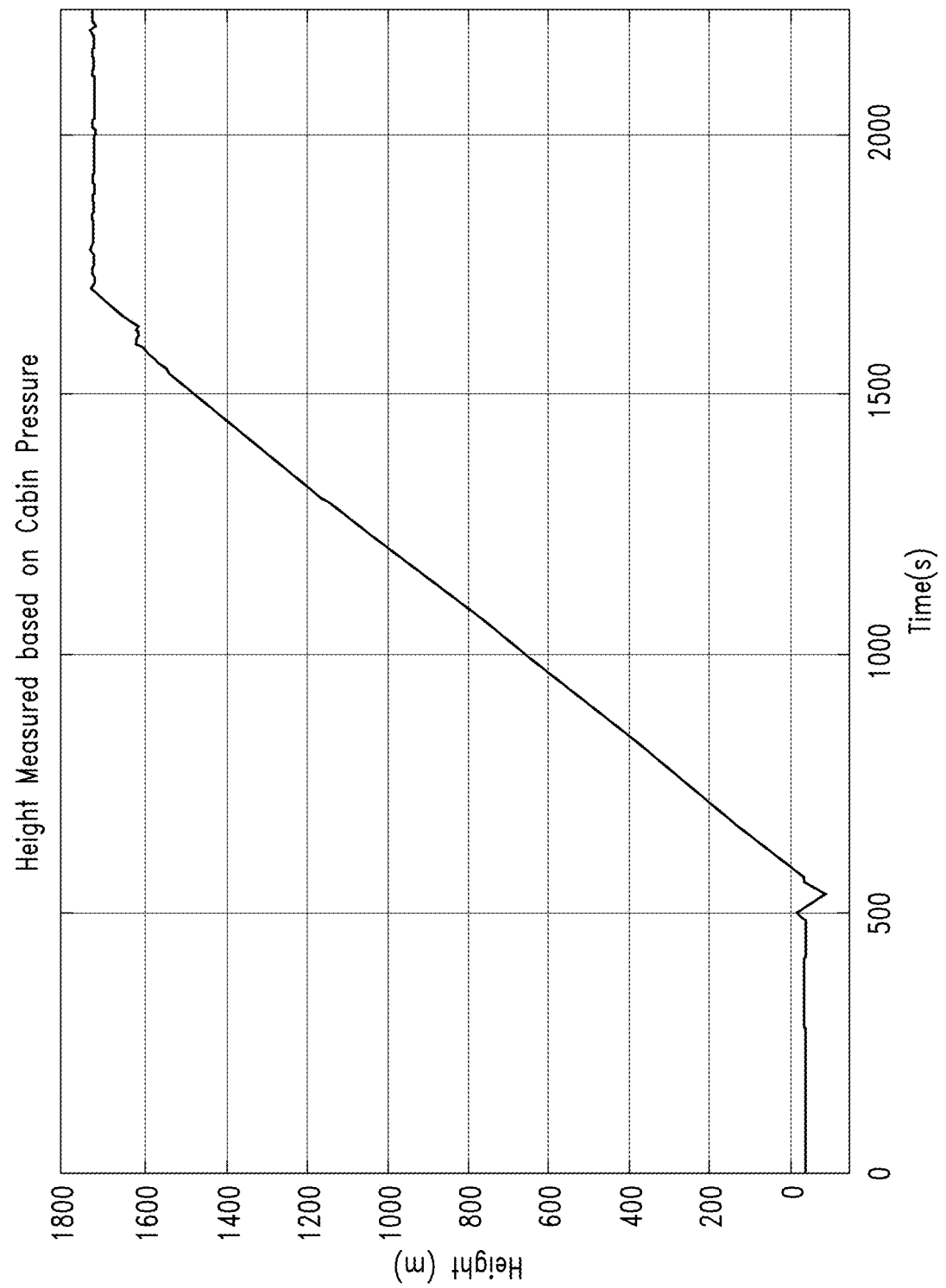
FIGS. 9 and 10 are graphical illustrations of indications of height based on cabin pressure.
Figure 10:
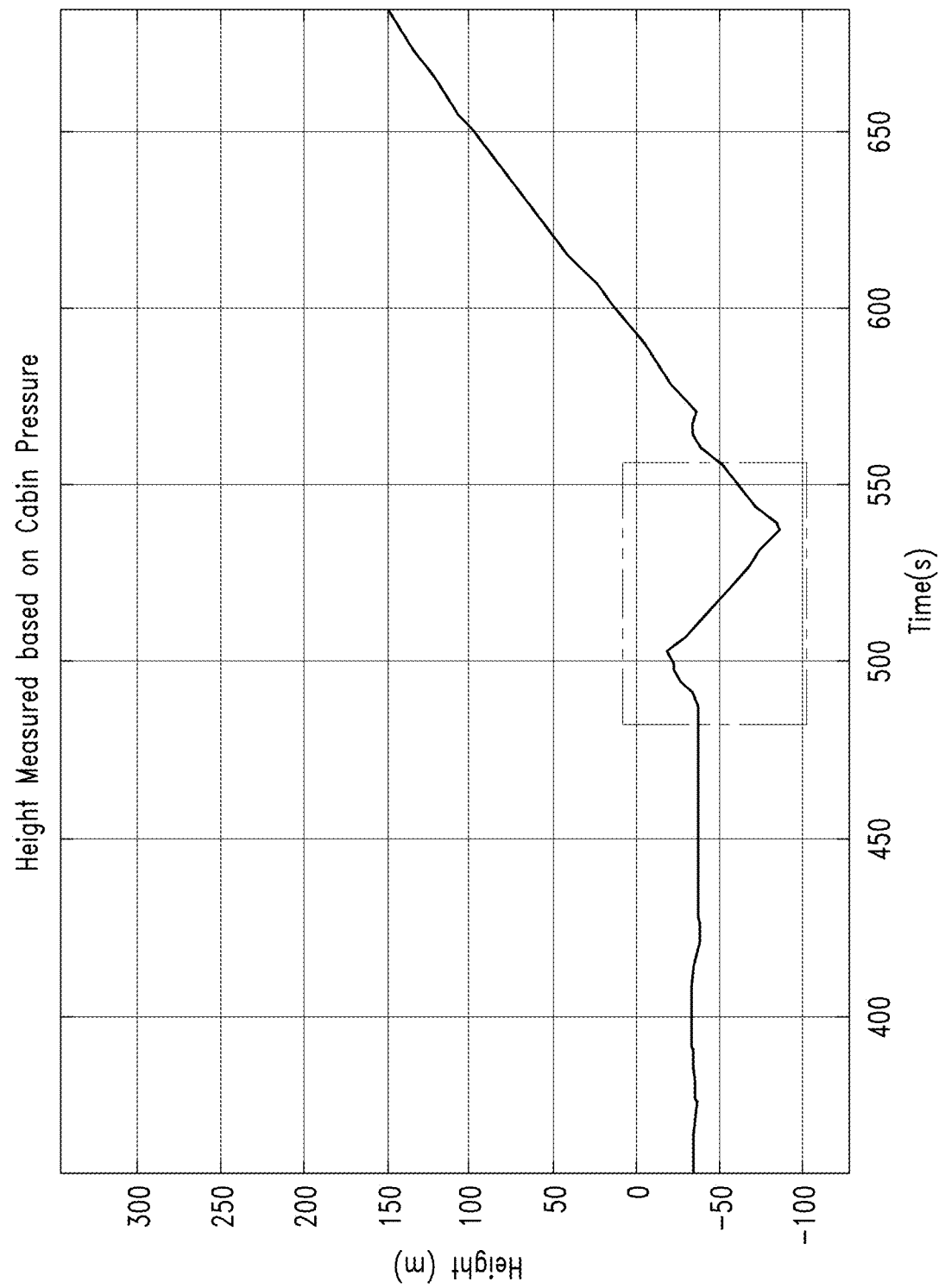

In an embodiment, detection of a runway state or of a take-off state based on accelerometer data may be validated using pressure data, and an inflight state may be detected based on pressure data. FIGS. 9 and 10 illustrate example indications of height based on cabin pressure, such as measurements of a pressure sensor of a device in the airplane cabin. The pressure data may be used to detect changes in pressure which are consistent or inconsistent with a runway state and a takeoff state.

As mentioned above, most aircraft pressurize the cabin before takeoff to make the transition when taking off from ground more comfortable, and then gradually reduce the pressure as shown in FIGS. 9 and 10. In an embodiment, a pre-takeoff pressurization state may be detected by checking for an increase in pressure (decrease in height), measured by a pressure sensor of a device, which is within a threshold range and occurs within a threshold period of time. For example, an increase in pressure corresponding to a decrease in height of 40-70 meters within a 50-second time window may serve as an indication the device is in a pre-takeoff pressurization state.

In response to detecting a pre-takeoff pressurization state, an embodiment may start to monitor pressure data to detect an assent state. During an assent, an airplane typically keeps gaining altitude and pressure inside the cabin is gradually reduced. In an embodiment, pressure changes indicative of the slope of altitude increase and the change in altitude from the takeoff state may be monitored, and this information may be used to confirm a takeoff state and to detect a change from a takeoff state to a flying state. For example, if the pressure data indicates the altitude has changed by more than 200 m and rate of change in altitude is 200 ft/min, the pressure data may be deemed consistent with an airplane mode of operation. The accelerometer and the pressure data may be employed together. For example, the threshold height change may be reduced to 150 m if accelerometer data is consistent with detection of both runway and takeoff states.

In an embodiment, other sensor data may be employed as part of a transportation mode detection scheme of a portable device. For example, sensed indications of temperature may be employed. In the context of an aircraft, the temperature of the cabin may typically be maintained within a threshold range such as 18-27 degrees Celsius. The detection scheme may then consider whether the temperature is above a threshold value, such as 18 degrees Celsius.

In an embodiment, accelerometer data, pressure data and optionally temperature data are employed to detect an airplane mode and to generate control signals to appropriately limit the function of a portable device, such as a cell-phone, a laptop, a tablet, an asset tracking device, etc., based on the detected airplane mode. The device may have a motion sensor (e.g., an accelerometer such as a 3-axis accelerometer, a gyroscope, etc.), a pressure sensor, and a temperature sensor.

Increases and decreases in pressure, acceleration and temperature may serve as indications of various airplane mode states or of transitions between the various states. Threshold values and differences may be employed to determine the states and transitions, and the threshold values and differences may be different for different electronic devices or circumstances (e.g., an asset tracking device likely to be in an unpressurized and unheated cargo hold might employ different thresholds than a cell phone likely to be in a pressurized, heated passenger cabin; initial data consistent with travel in a small airplane may result in the use of different thresholds to detect state changes than the thresholds used when the initial data is consistent with travel in a large jet; etc.).

The detected modes or states may include pre-takeoff runway state, takeoff state, in-flight state, landing state, and post-landing runway state. Other states may be detected (e.g., a seated in the airplane state, an at the gate state, a not on the airplane state). Previous state information may be employed to facilitate detecting a current state.

Different functions of the portable device may be enabled or disabled upon detection of entering, exiting or transitioning between the various states. For example, upon detecting a pre-takeoff runway state or a landing state, the following functions of a portable electronic device may be disabled: drawing power (e.g., from an airplane charge port or a charger); cell-phone communications; GPS communications; wifi communications; selected applications (e.g., noisy applications); all applications; etc.

Upon transitioning from a take-off state to an inflight state, some functionality may be restored, such as: drawing power; wifi; and some disabled applications. Other functionality may not be restored, such as cell-phone communications and GPS communications. Some embodiments may employ fewer control modes than detection modes (e.g., no action may be taken upon transitioning from pre-take-off runway state to takeoff state).

Upon transitioning from a post-landing runway state to an at the gate state, some or all functionality may be restored.

An embodiment may also detect when a state has likely been aborted or a previous state determination was likely incorrect, and take corrective action.

Figure 11:
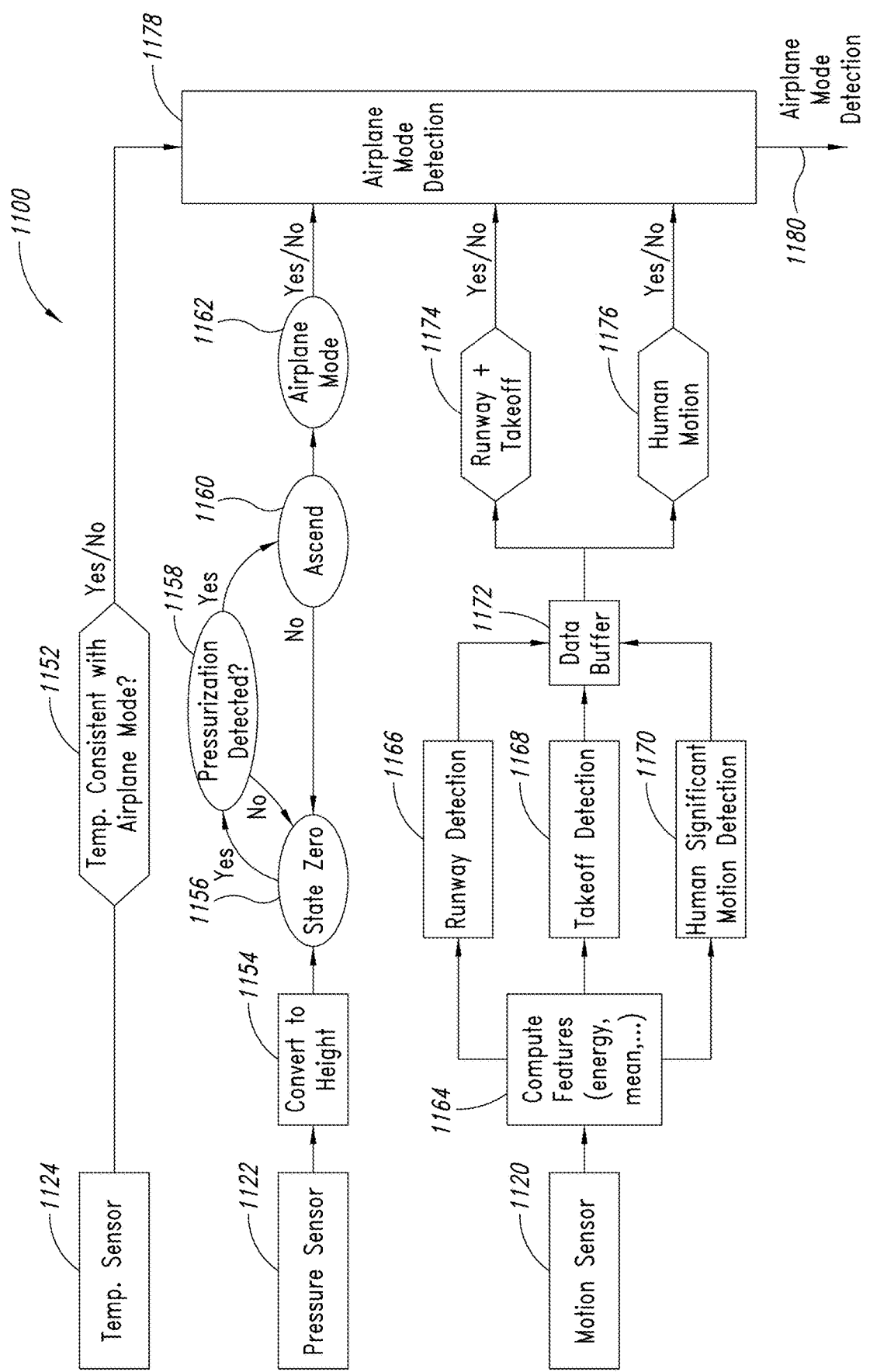
FIG. 11 illustrates an example embodiment of a flow diagram of a transportation mode detection method.

FIG. 11 is a flow chart of an embodiment of a method 1100 of detecting one or more transportation states of a mobile device and generating one or more signals to control one or more operational modes of the mobile device based on the one or more detected transportation states. The method 1100 of FIG. 11 will be described for convenience with reference to FIGS. 1-10 and with the detection of states consistent with generating control signals to cause the device to enter an airplane mode of operation. Other states may be detected and other modes of operation selected or deselected based on the detected states. For example, a post-landing runway state may be detected and a transition from an airplane mode of operation to a normal mode of operation selected based on the detection of a post-landing runway state. In another example, a cruising state may be detected and an airplane mode enabling WiFi communications may be entered; subsequently, a descending state may be detected and WiFi communications disabled, etc. The method 1100 may be implemented, for example, by a system such as the system 100 of FIG. 1.

At 1124, temperature data is sensed, for example, by a sensor 124, or retrieved, for example from a memory. The method 1100 proceeds from 1124 to 1152, where the temperature data is analyzed to determine whether the temperature data is consistent with a transportation state of a mobile device. For example, data from temperature sensor 124 of FIG. 1 may be compared to one or more thresholds or threshold ranges to determine whether the temperature data is consistent with a particular transportation state of a mobile device. For example, temperature data indicative of a temperature between 18 and 27 degrees Celsius may be determined to be consistent with one or more airplane cabin states (e.g., runway state, takeoff state, flying state, landing state, etc.). It is noted that a different thresholds and threshold ranges may be employed for different devices. For example, a transponder expected to be in an aircraft cargo hold may employ different thresholds than a mobile telephone. A signal indicative of the determination at 1152 is generated. For example, a binary signal indicative of a yes/no determination may be generated.

At 1122, pressure data is sensed, for example, by a sensor 122, or retrieved, for example from a memory. The method 1100 proceeds from 1122 to 1154, where the pressure data is converted to height data. The method 1100 enters state zero at 1156, where the method 1100 may wait for an indication to transition to a pressurization detection state 1158. For example, an indication that a runway mode has been detected based on motion data, or another indication to proceed to a new state, such as changes in height data exceeding one or more thresholds within a threshold period of time, may trigger a transition to the pressurization detection state 1158.

At pressurization detection state 1158, height data is analyzed to determine whether the height data is consistent with a pre-takeoff cabin pressurization. This may be done, for example, by checking for increases and decreases in height/pressure within a time window which are consistent with pre-flight cabin pressurization. When it is determined at pressurization detection state 1158 that pre-flight cabin pressurization has been detected, the method 1100 proceeds from state 1158 to state 1160. For example, when the height data is consistent with a drop of 40-70 meters within 50 seconds, pre-flight cabin pressurization may be detected.

When it is determined at state 1158 that pre-flight cabin pressurization has not been detected, the method 1100 returns to state 1156.

At ascend detection state 1160, height data is analyzed to determine whether the height data is consistent with an ascension during a flight. For example, pressure changes indicative of the slope of altitude increase and the change in altitude from the takeoff state may be monitored, and this information may be used to confirm an ascension state. For example, if the pressure data indicates the altitude has changed by more than 200 m and rate of change in altitude is 200 ft/min, the pressure data may be deemed consistent with an ascension state. When it is determined at ascend detection state 1160 that ascension has been detected, the method 1100 proceeds from state 1160 to state 1162. When it is determined at state 1160 that ascension has not been detected, the method 1100 returns to state 1156.

At state 1162, the method 1100 generates a signal indicative of whether the pressure data is consistent with an airplane mode of operation.

At 1120, motion data is sensed, for example, by a sensor 120, or retrieved, for example from a memory. The method 1100 proceeds from 1120 to 1164, where the motion data is analyzed to compute feature data, such as energies of acceleration, mean values, etc. The feature data is used at 1166 to perform runway detection, at 1168 to perform takeoff detection and at 1170 to detect whether significant human motion has occurred. The results of the determinations at 1166, 1168 and 1170 are stored in a data buffer at 1172.

At 1174, the method 1100 determines whether the data stored in the buffer are consistent with both a runway and a takeoff state, and generates a signal indicative of a result of the determination. At 1176, the method 1100 determines whether the data stored in the buffer are consistent with significant human motion inconsistent with an airplane transportation state within a threshold time period.

At 1178, the method 1100 determines whether to enter an airplane mode of operation based on the signals generated at acts 1152, 1162, 1174 and 1176. When the signals are consistent with an airplane mode of operation, the method 1100 generates a control signal 1180 to cause a device, such as the device 100 of FIG. 1, to enter an airplane mode of operation. For example, if the signal generated at 1152 indicates the temperature data is consistent with an aircraft cabin temperature, the signal generated at 1162 indicates the pressure data is consistent with a takeoff, the signal generated at 1174 is consistent with a takeoff, and the signal generated at 1176 does not indicate significant human motion within a threshold period of time which is inconsistent with a takeoff state, the method 1100 may generate a control signal 1180 to cause a device to enter an airplane mode of operation.

Embodiments of methods of controlling transportation modes of electronic devices may contain additional acts not shown in FIG. 11, may not contain all of the acts shown in FIG. 11, may perform acts shown in FIG. 11 in various orders, and may be modified in various respects. For example, the method 1100 may combine acts 1166, 1168 and 1170; may perform acts in parallel or iteratively; etc.; and various combinations thereof. Look-up tables may be employed to determine whether sensed data is consistent or inconsistent with a transportation mode of a device.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various embodiments and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
   one or more memories; and
   travel mode control circuitry including one or more processors and coupled to the one or more memories, wherein the travel mode control circuitry, in operation, automatically:
   determines an energy of acceleration based on motion data;
   compares temperature data to one or more thresholds;
   detects an airplane runway state of the device based on the determined energy of acceleration and the comparing;
   responds to detection of the airplane runway state of the device by monitoring motion data and pressure data to detect a transition from the airplane runway state to an airplane takeoff state of the device; and
   responds to detection of the transition to the airplane takeoff state of the device by generating one or more control signals to cause the device to enter a first airplane travel mode of operation.

2. The device of claim 1, wherein the travel mode control circuitry, in operation, determines whether the temperature data indicates a temperature of the device is within a threshold temperature range.

3. The device of claim 1 wherein the travel mode control circuitry, in operation, employs a motion activation detection algorithm to detect the airplane runway state.

4. The device of claim 3 wherein the travel mode control circuitry, in operation, employs the motion activation detection algorithm to detect the transition to the airplane takeoff state.

5. The device of claim 1 wherein the travel mode control circuitry, in operation:
monitors the motion data to detect significant human motion inconsistent with the airplane runway state; and
responds to detection of significant human motion inconsistent with the first travel state by determining the device is not in the airplane runway state.

6. The device of claim 1 wherein the travel mode control circuitry, in operation:
responds to detection of the transition to the airplane takeoff state by monitoring motion data and pressure data to detect a transition from the airplane takeoff state to another state; and
responds to detection of the transition to the another state by generating one or more control signals to cause the device to enter a second airplane travel mode of operation.

7. The device of claim 1 wherein the travel mode control circuitry, in operation:
responds to detection of the airplane runway state by monitoring motion data, temperature data and pressure data; and
responds to monitored data inconsistent with the airplane runway state by determining the airplane runway state is not detected.

8. The device of claim 1 wherein the travel mode control circuitry, in operation, employs one or more thresholds values and one or more threshold periods of time to detect a travel state of the device.

9. A system, comprising:
a temperature sensor;
a pressure sensor; and
a motion sensor; and
travel mode control circuitry including one or more processors and coupled to the temperature sensor, the pressure sensor and the motion sensor, wherein the travel mode control circuitry, in operation, automatically:
monitors motion data to determine an energy of acceleration;
compares temperature data to one or more thresholds;
detects an airplane runway state based on the determined energy of acceleration and the comparing;
responds to detection of the airplane runway state by monitoring motion data and pressure data to detect a transition from the airplane runway state to an airplane takeoff state; and
responds to detection of the transition to the airplane takeoff state by generating one or more control signals to cause the system to enter a first airplane travel mode of operation.

10. The system of claim 9 wherein the travel mode control circuitry, in operation, determines whether the temperature data indicates a temperature is within a threshold temperature range.

11. The system of claim 9 wherein the travel mode control circuitry, in operation, employs a motion activation detection algorithm to detect the airplane runway state.

12. The system of claim 9 wherein the travel mode control circuitry, in operation:
monitors the motion data to detect significant human motion inconsistent with the airplane runway state; and
responds to detection of significant human motion inconsistent with the airplane runway state by determining the airplane runway state is not detected.

13. A computer-implemented method, comprising automatically:
determining an energy of acceleration based on motion data;
comparing temperature data to one or more thresholds;
detecting an airplane runway state of a device based on the determined energy of acceleration and the comparing;
responding to detection of the airplane runway state of the device by monitoring motion data and pressure data to detect a transition from the airplane runway state to an airplane takeoff state of the device; and
responding to detection of the transition to the airplane takeoff state of the device by generating one or more control signals to cause the device to enter a first airplane travel mode of operation.

14. The method of claim 13, comprising employing a motion activation detection algorithm to detect the airplane runway state.

15. A non-transitory computer-readable medium having contents which cause travel mode control circuitry to perform an automatic method, the method comprising:
determining an energy of acceleration based on motion data;
comparing temperature data to one or more thresholds;
detecting airplane runway state of a device based on the determined energy of acceleration and the comparing;
responding to detection of the airplane runway state of the device by monitoring motion data and pressure data to detect a transition from the airplane runway state to airplane takeoff state of the device; and
responding to detection of the transition to the airplane takeoff state of the device by generating one or more control signals to cause the device to enter a first airplane travel mode of operation.

16. The non-transitory computer-readable medium of claim 15 wherein the contents comprise instructions executed by the travel mode control circuitry.

17. The non-transitory computer-readable medium of claim 15 wherein the method comprises:
responding to detection of the transition to the airplane takeoff state by monitoring motion data and pressure data to detect a transition from the airplane takeoff state to another state; and
responding to detection of the transition to the another state by generating one or more control signals to cause the device to enter a second airplane travel mode of operation.

18. The method of claim 13, comprising:
responding to detection of the transition to the airplane takeoff state by monitoring motion data and pressure data to detect a transition from the airplane takeoff state to another state; and
responding to detection of the transition to the another state by generating one or more control signals to cause the device to enter a second airplane travel mode of operation.

19. The device of claim 1 wherein the travel mode control circuitry, in operation, determines whether monitored changes in pressure are consistent with a transition from the airplane runway state to the airplane takeoff state.

* * * * *